(12) United States Patent
Parrotta et al.

(10) Patent No.: US 7,208,209 B1
(45) Date of Patent: Apr. 24, 2007

(54) TEAR RESISTANT CONTAINER

(75) Inventors: Michael Andrew Parrotta, Churchville, PA (US); Robert Larry Flowers, Coatesville, PA (US)

(73) Assignee: Meadwestvaco Corporation, Glen Allen, VA (US)

( * ) Notice: Subject to any disclaimer, the term of this patent is extended or adjusted under 35 U.S.C. 154(b) by 0 days.

(21) Appl. No.: 11/251,698

(22) Filed: Oct. 17, 2005

Related U.S. Application Data

(62) Division of application No. 10/409,540, filed on Apr. 8, 2003, now abandoned.

(60) Provisional application No. 60/370,357, filed on Apr. 8, 2002.

(51) Int. Cl.
- B32B 27/32 (2006.01)
- B65D 71/42 (2006.01)
- B65D 75/00 (2006.01)
- B65D 5/02 (2006.01)
- B65D 5/08 (2006.01)

(52) U.S. Cl. ............... 428/35.7; 428/36.4; 428/36.92; 428/542.8; 206/229; 206/524.1; 206/807; 206/813; 206/819; 206/784; 229/100; 229/5.84; 229/185.1; 229/102

(58) Field of Classification Search ............ 428/35.7, 428/36.4, 36.92, 542.8; 206/229, 524.1, 206/807, 813, 819, 784; 229/100, 5.84, 185.1, 229/102
See application file for complete search history.

(56) References Cited

U.S. PATENT DOCUMENTS

| | | |
|---|---|---|
| 3,301,462 A * | 1/1967 | Starr .................. 229/136 |
| 3,649,437 A | 3/1972 | Wolinski |
| 3,980,005 A | 9/1976 | Buonaiuto |
| 4,256,526 A | 3/1981 | McDaniel |
| 4,447,479 A | 5/1984 | Harrison et al. |
| 4,457,431 A | 7/1984 | Lundquist et al. |
| 4,535,929 A | 8/1985 | Sherman et al. |
| 4,540,721 A | 9/1985 | Staller |
| 4,653,252 A | 3/1987 | van de Haar et al. |
| 5,018,337 A | 5/1991 | Carter et al. |
| 5,049,441 A | 9/1991 | Jenkins et al. |
| 5,060,853 A | 10/1991 | Gulliver et al. |
| 5,148,970 A | 9/1992 | Johnston |
| 5,201,698 A | 4/1993 | Kobayashi |
| 5,259,551 A | 11/1993 | Davis |
| 5,364,333 A | 11/1994 | Gulliver et al. |
| 5,368,158 A | 11/1994 | Miaud |
| 5,709,913 A | 1/1998 | Andersen et al. |
| 5,783,030 A | 7/1998 | Walsh |
| 5,794,812 A | 8/1998 | Walsh |
| 5,800,647 A | 9/1998 | Andersen et al. |
| 5,851,634 A | 12/1998 | Andersen et al. |
| 5,871,148 A | 2/1999 | Hafer et al. |
| 6,070,790 A | 6/2000 | Anderson |
| 6,071,366 A | 6/2000 | Yamada et al. |

(Continued)

Primary Examiner—Alicia Chevalier
Assistant Examiner—Chris Bruenjes

(57) ABSTRACT

The invention teaches a container formed from a synthetic substrate. The synthetic substrate is substantially tear resistant and includes polyethylene and inorganic minerals. The synthetic substrate is cut and scored to form a container blank of desired shapes and sizes. At least some portion of the container blank is coated with an adhesive. The container blank is folded and or otherwise manipulated so that at least some portion of the container blank is secured to another surface of the container blank to form a partially closed container with at least one opening.

8 Claims, 3 Drawing Sheets

U.S. PATENT DOCUMENTS

| | | |
|---|---|---|
| 6,280,825 B1 | 8/2001 | Olvey |
| 6,436,500 B1 | 8/2002 | Yingst et al. |
| 6,536,657 B2 | 3/2003 | Van Handel |
| 6,554,182 B1 | 4/2003 | Magnusson et al. |
| 6,739,453 B1 | 5/2004 | Mazurek |
| 6,815,475 B2 | 11/2004 | Donald et al. |
| 6,854,639 B2 | 2/2005 | Walsh |
| 6,855,387 B2 | 2/2005 | Yamada et al. |
| 2001/0009259 A1 | 7/2001 | Wakayama |
| 2001/0022211 A1 | 9/2001 | Walsh |
| 2002/0129891 A1* | 9/2002 | Harrison .................. 156/207 |
| 2003/0038169 A1 | 2/2003 | Thibault |
| 2003/0148124 A1 | 8/2003 | Yamada et al. |
| 2004/0083683 A1 | 5/2004 | Russell |
| 2004/0166238 A1 | 8/2004 | Nowiciki |
| 2005/0074621 A1 | 4/2005 | Reighard et al. |
| 2005/0089660 A1 | 4/2005 | Jokela et al. |
| 2005/0109827 A1 | 5/2005 | Martin |
| 2005/0112305 A1 | 5/2005 | Swoboda et al. |

* cited by examiner

TEAR RESISTANT CONTAINER

CROSS REFERENCE TO RELATED APPLICATIONS

This application is a divisional application of U.S. patent application Ser. No. 10/409,540 filed on Apr. 8, 2003, now abandoned, which claims the benefit of U.S. provisional application No. 60/370,357 filed on Apr. 8, 2002.

TECHNICAL FIELD OF THE INVENTION

This invention relates to a container and method of forming a container from a synthetic substrate.

DESCRIPTION OF RELATED ART

Conventional containers, such as retail containers for cosmetics, pharmaceutical, and computer related items are typically made from conventional substrates, such as paperboard and the like, that are easily torn. Typically, at least one side of the conventional substrate is printed with information, such as product description, graphic, and advertising information. The conventional substrate is then formed into individual container blanks, typically by cutting the substrate using well-known techniques. An exemplary technique is to feed a continuous web substrate into a die cutting assembly. Individual container blanks are cut from the web by a die cutter. An exemplary cutting technique involves the use of a platten die cutter assembly. After the individual container blank is cut from the web, fold lines and the like can be formed on the container blank typically after exiting the die cutting apparatus. Conventional containers are formed by securing parts of the container blank to each other with adhesives. One end is left open so that a product can be placed in the container. The container is closed by securing a flap over the opening.

A major drawback of containers made from conventional substrates is the relative ease with which the container can be opened after it is closed. The adhesive bonds of conventional containers are generally weak. In general, the adhesive bonds are designed to quickly close the container during a fast moving container fill operation. The bond must only be sufficient to keep the container closed until it is opened by the end user. In fact conventional containers typically can be opened without any mechanical assistance, such as knives or scissors. High value items, such as cosmetics, pharmaceuticals, and computer items are often placed in conventional containers. In a retail setting, these conventional containers are easily opened by shoplifters with minimal effort. After removing the item from the conventional container, the shoplifter can simply place the empty conventional container back on the shelf or display leaving little notice that the container is empty.

One option to replace conventional containers is the use of expensive plastic "clam shell" containers or packages. "Clam shell" containers typically require the use of mechanical assistance, such as scissors, to open them. However, a major drawback of "clam shell" containers is the requirement for expensive container and product fill line equipment. Another drawback is that "clam shell" containers often limit the amount of printable surfaces on the container. Thus "clam shell" containers often require a separate means for placing printed information inside or external to the container. Other alternative containers have used substrates such as TYVEK® by Dupont, composite substrates, such as plastic and metallized films laminated to paperboard substrates, and polymeric materials substrates to increase the difficulty in opening the container. However these alternative containers have numerous limitations such as poor printing surfaces, high cost of material, and often require new expensive equipment to work on existing product fill operations, etc.

What is needed is a container formed from a substantially tear resistant substrate that offers the printing quality of a conventional paperboard container, can operate with existing conventional paperboard container product fill lines, and after closure is difficult to open without mechanical assistance.

SUMMARY OF THE INVENTION

The invention teaches a container formed from a synthetic substrate. The synthetic substrate is substantially tear resistant and comprises polyethylene and inorganic minerals. The synthetic substrate is cut and scored to form a container blank of desired shapes and sizes. At least some portion of the container blank is coated with an adhesive. The container blank is folded and or otherwise manipulated so that at least some portion of the container blank is secured to another surface of the container blank to form a partially closed container with at least one opening.

The features of the invention are best understood by considering the following detailed description in conjunction with the accompanying figures.

DETAILED DESCRIPTION OF THE INVENTION

Figure 1:
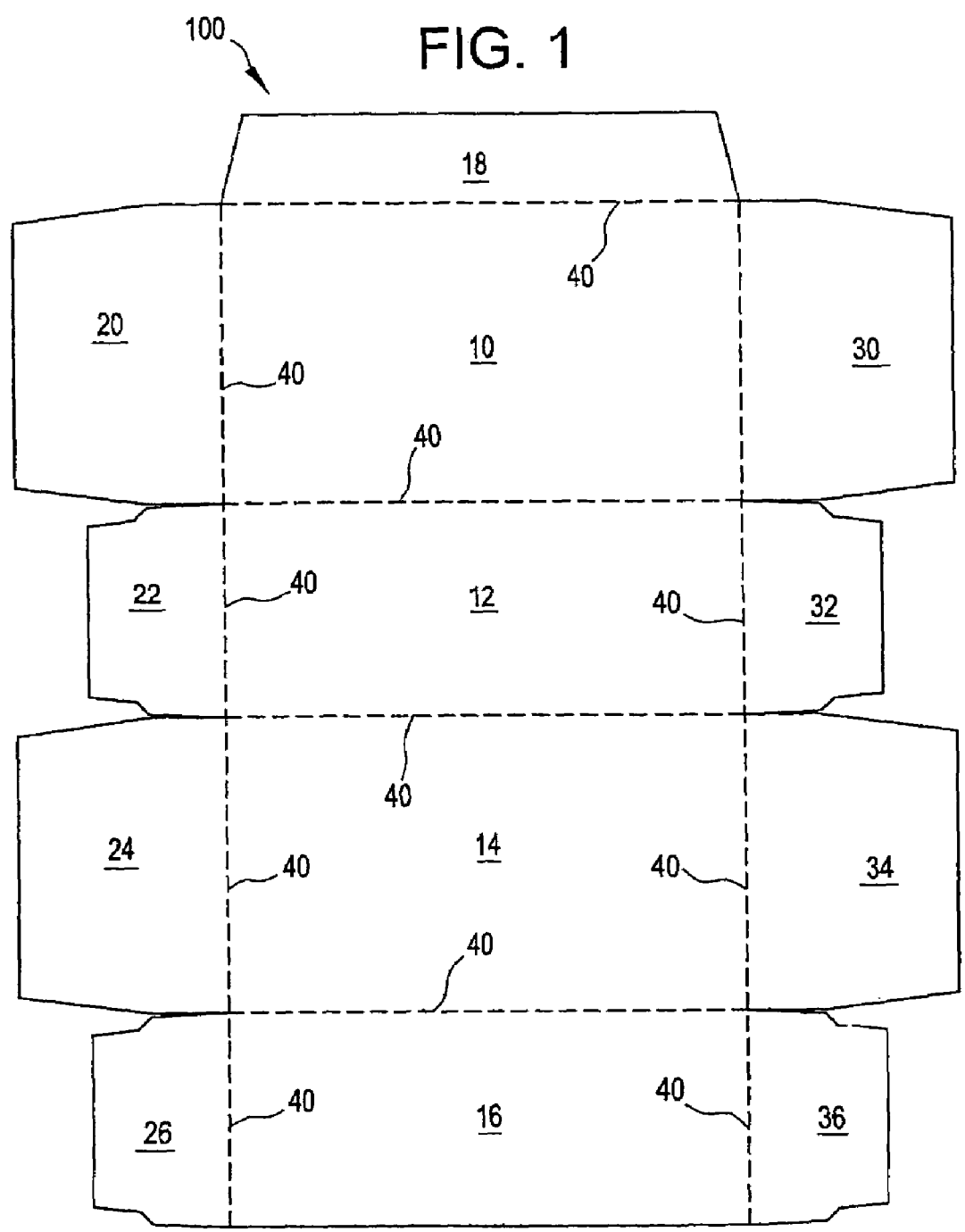
FIG. 1 shows a plan view of an exemplary container blank according to the invention.

FIG. 1 illustrates an exemplary container blank 100 according to the invention. The blank 100 has four main panels 10, 12, 14, 16. A glue flap 18 is shown secured to a first panel 10. Also illustrated are fold lines 40 that separate the main panels 10, 12, 14, 16 from the remainder of the blank 100. Flaps 20, 22, 24, 26 are shown secured to one end of the main panels 10, 12, 14, 16 and flaps 30, 32, 34, 36 are shown secured to an opposite end of the main panels. It is to be understood that many other shapes and configurations for a container blank are possible. For example, a container could have more of less main panels as well as more or less flaps than illustrated. The container blank 100 of FIG. 1 is provided as a general illustration of a container blank. It is to further be understood that a container blank could also be designed to mate with a blister container or a packaging shell. A container blank could also be designed to wrap around another box, container, package, or product. In addition, the container blank could have one of more apertures. For example, the container could also have a folding flap to secure a blister package containing disposable razors or pills. Furthermore, any apertures could be covered with transparent materials.

An exemplary container or package according to the invention is formed from a tear resistant synthetic substrate. In an exemplary embodiment, the substrate is a synthetic substrate, such as POLYLITH® GC-3 manufactured by Nanya Plastics of Taiwan and distributed in the United States by Granwell Products, Inc. of West Caldwell, N.J. The referenced POLYLITH® substrate referred to as synthetic paper and is manufactured under a proprietary manufacturing process and an exact chemical composition is not known. However the two main components of the synthetic substrate are polypropylene resin and minerals comprising inert calcium carbonate and titanium dioxide. The synthetic substrate is strengthened by calendering the synthetic substrate. The minerals form a smooth surface that improves printing on the synthetic substrate. In addition, they provide a surface appearance and texture similar to coated paperboard. The synthetic substrate is further believed to contain a high density polyethylene (HDPE). The synthetic substrate exhibits some orientation in the machine direction and cross direction. The synthetic substrate is optionally corona treated on both sides and optionally at least one side is gloss finished.

An exemplary synthetic substrate also has an opacity in excess of about 85, whiteness in excess of about 86, tensile strength in the machine direction in excess of about 3,000 pounds per square inch (ASTM D-638), and tear strength in the machine direction in excess of about 2,100 grams per millimeter (ASTM D-1922). In addition the exemplary synthetic substrate has a thickness range of about 4.0 to about 20 mil, with an exemplary range of about 10 mil or greater.

It is well known to use POLYLITH® synthetic substrates of various grades and the like in a wide range of products such as posters, labels, maps, menus, cards, tags, charts, placemats, and banners. However, POLYLITH® synthetic substrates and the like have not been used for containers prior to this invention due to the previously unsolved problem of securing the surfaces of the synthetic substrate to each other using adhesives and the lack of operational knowledge to use them with conventional carton forming equipment.

It is to be understood that the above description is not intended to limit the scope of the claimed invention to containers formed from the exemplary POLYLITH® GC-3 synthetic substrate. Other suitable synthetic substrates include products manufactured by USI Plastics of France and Kimberly Clark Corporation of the United States. In general, synthetic substrates made from polyolefin, polypropylene or other suitable compounds that are tear resistant at desirable container thickness ranges are within the scope of the invention. In addition the synthetic substrates can be formed with many variation or combination of orientations that improve their tear resistance.

In general, suitable synthetic substrates should work with conventional packaging equipment as a substitute for conventional paperboard substrates. Suitable synthetic substrates should also be dimensionally stable when exposed to moisture and humidity. In addition they should resist cracking, shrinking or distortion in both size and color. Suitable synthetic substrates should generally work well with the following printing techniques: flexographic, lithographic, gravure, letterpress, screen-printing, and thermal transfer. Suitable synthetic substrates should have good ink coverage and superior print fidelity qualities. Suitable inks include ultra violet lithography or electron beam curable inks as well as solvent and water-based inks. It is to be understood that the printed layer may also be coated with varnish such as ultraviolet curable acrylate. Moreover suitable synthetic substrates should be capable of being embossed, foil stamped, scored, perforated, die cut, or thermal formed using conventional techniques and equipment.

In accordance with the invention, substantially tear resistant containers can be made using suitable synthetic substrates. First, the appropriate shape and size of the container's main panels and flaps must be properly dimensioned to provide an adequate surface contact and overlap area for the various flaps and panels after folding. Second, the adhesive to secure the flaps and panels must be properly selected so that conventional container manufacturing and conventional product fill line techniques can be used. Third, the container blank should be laid out to maximize the tear resistant properties of the synthetic substrate. For example, if the synthetic substrate has a stronger tear strength in one direction, than the panels and flaps can be laid out and the adhesive applied in an optimal location so that any exposed tearing surface would be along the strongest orientation. In addition, the container blanks could be also printed and cut along a 45-degree alignment or any other optimal alignment to maximize the tear strength orientations of the synthetic substrate.

Figure 2:
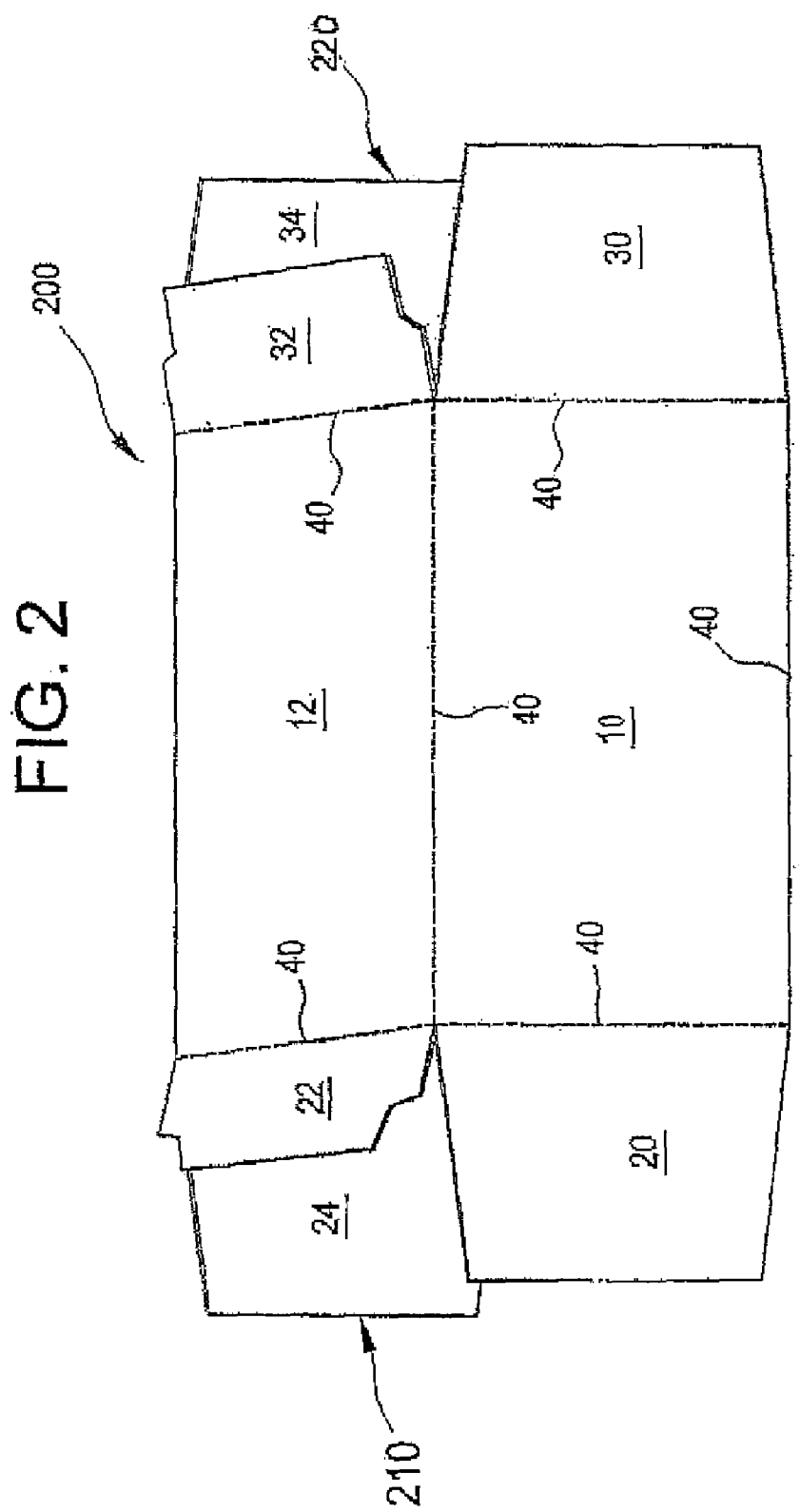
FIG. 2 is a top view of a partially formed container from the blank of FIG. 1.

As illustrated in FIG. 2 a partial container 200 is formed from the blank of FIG. 1. The container 200 is formed by securing two regions of the blank to each other. An exemplary technique is illustrated by securing glue flap 18 to main panel 16. Typically this is done on a high-speed container forming machine (not shown). The flap 18 and panel 16 surfaces are secured to each other using adhesives. It is to be understood that after the adhesive is applied to either flap 18 or panel 16 they may also be mechanically pressed or squeezed together for at least some period of time to facilitate adhesion of the two surfaces 16, 18. The partially formed container 200 is illustrated with two open ends 210, 220.

It has been discovered that certain adhesives allow the exemplary synthetic substrates to be formed into a suitable container using conventional container forming equipment. Exemplary commercial adhesives include moisture cured reactive polyurethane adhesives, such as PUR-FECT LOK® 34-9000 urethane adhesive manufactured by National Starch & Chemical, a member of the ICI Group, of Bridgewater, N.J. Additional exemplary adhesives include: non-reactive polyurethane, cyanoacrylate, modified polyester resins, acrylic hot melts, and ultra-violet cured acrylic. The exemplary adhesives bond or fuse the panels or flaps together and create a bond between the two surfaces with a tear strength approximately equal to or greater than that of the synthetic substrate.

For securing the open ends 210, 220, a fast curing adhesive is desirable. A suitable adhesive must develop a bond in sufficient time to maintain the container's shape during the fill operation. An exemplary adhesive will develop additional bond strength during "cure time" (prior to the container reaching the end user).

A first exemplary adhesive for open ends 210, 220 includes a blend of ethylene vinyl acetate (EVA) co-polymer and styrene-butadiene-styrene (SBS) or styrene-ethylene-butadiene-styrene (SEBS) resins with exemplary additives such at antioxidants, tackifiers and plasticizers. Commercial brands of EVA, SBS or SEBS, antioxidants, and plasticizers are acceptable such as Dupont's ELVAX 150W®, Shell's KRATON G or D®, antioxidants, and plasticizers, such as, SHEREX 770® or PARAPLEX G90®, respectively. An exemplary adhesive mixture includes by weight approximately 48.5% EVA, 48.5% SBS, 1% antioxidants, and 2% polymeric plasticizers. Another exemplary adhesive mixture includes by weight approximately 68.5% EVA, 28.5% SBS, 1% antioxidants, and 2% polymeric plasticizers.

A second exemplary adhesive includes a blend of ethylene vinyl acetate (EVA) co-polymer, styrene-butadiene-styrene (SBS) or styrene-ethylene-butadiene-styrene (SEBS) resins, and hydrocarbon, with exemplary additives such at antioxidants, tackifiers and plasticizers. An exemplary adhesive mixture includes by weight approximately 66.5% EVA, 26.5% SBS, 4.0% hydrocarbon, 1% antioxidants, and 2% polymeric plasticizers.

A third exemplary adhesive includes a blend of ethylene vinyl acetate (EVA) co-polymer, styrene-butadiene-styrene (SBS) or styrene-ethylene-butadiene-styrene (SEBS) resins, and isoprene, with exemplary additives such at antioxidants, tackifiers and plasticizers. An exemplary adhesive mixture includes by weight approximately 46.5% EVA, 46.5% SEBS, 4.0% isoprene, 1% antioxidants, and 2% polymeric plasticizers. Another exemplary adhesive mixture includes by weight approximately 66.5% EVA, 26.5% SBS, 4.0% isoprene, 1% antioxidants, and 2% polymeric plasticizers.

Figure 3:
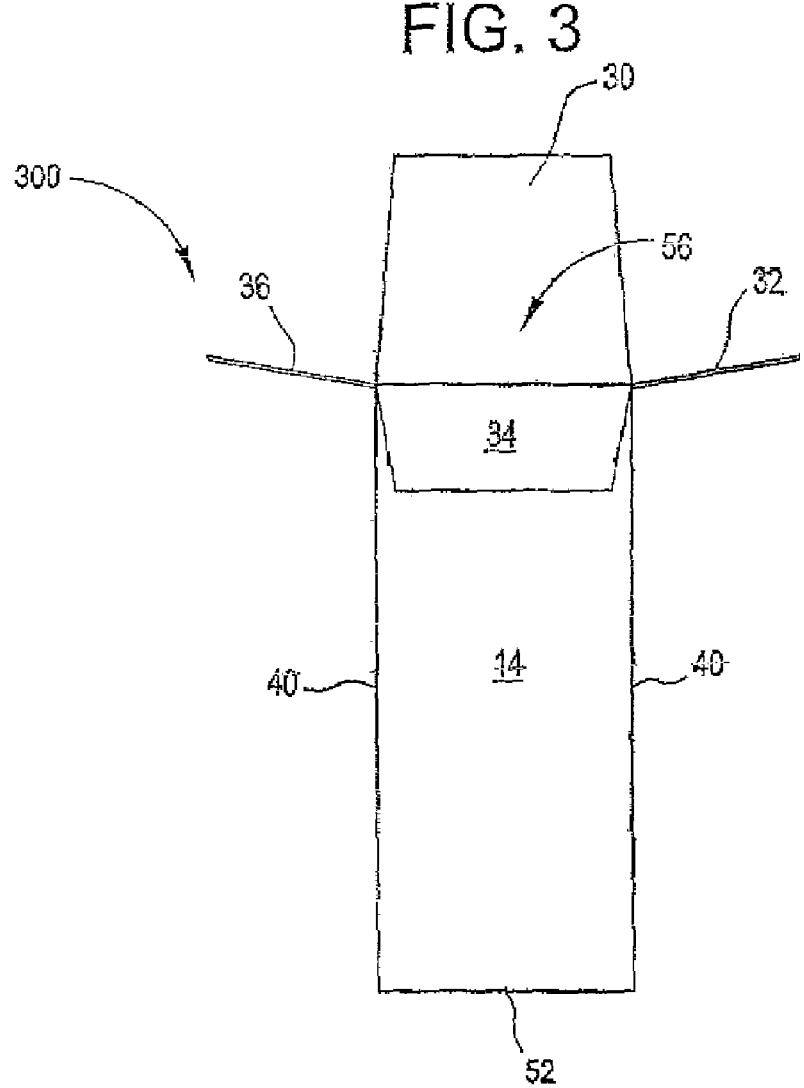
FIG. 3 is a front elevation view of an exemplary container formed from the partial container of FIG. 2.
Figure 4:
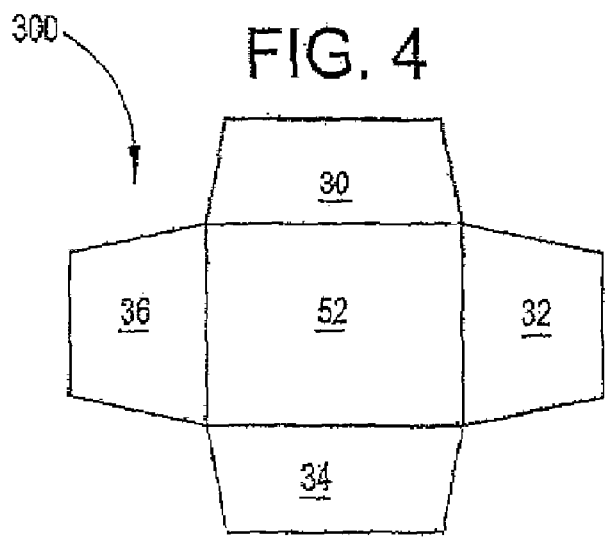
FIG. 4 is a top view of FIG. 3.

As illustrated in FIGS. 3 and 4, the partially formed container 200 (FIG. 2) is expanded into its final shape using conventional techniques (not shown). A first open end 210 of the partial container 200 is closed using the adhesives described above. Container 300 is illustrated with a closed end 52 and an open end 56. Closed end 52 is exemplary formed by folding flaps 20, 22, 24, 26 and securing at least two opposing flaps 20, 24 to each other. An exemplary method is to secure the opposing flaps using the exemplary adhesives described above. It is also possible that flaps 20, 22, 24, 26 could be secured to each other in numerous combinations. Container 300 is now ready to be filled with a product (not shown).

A product can be placed into container 300, via the container's open end 56. The product is exemplary supported by the closed end 52. The filled container (not shown) is then typically advanced on a product fill line and the second open end 56 is closed in a conventional manner using adhesives as described above.

Once given the above detailed description, many other features, modifications or improvements will become apparent to the skilled artisan. Such features, modifications or improvements are, therefore, considered to be a part of this invention, the scope of which is to be determined by the following claims.

What is claimed is:

1. A container for the secure storage of a product comprising, a main body portion formed from a container blank dimensioned, cut and scored to form a plurality of flaps, a plurality of panels, and a plurality of fold lines, wherein the container blank is formed from a calendered synthetic paper substrate having a chemical composition that includes polypropylene and inorganic minerals and wherein cyanoacrylate adhesive is applied to a first flap of said container blank and used to secure the first flap to a second flap of said container blank so as to form at least in part the main body portion of the container.

2. The container as recited in claim 1, wherein said synthetic paper substrate has a tensile strength in the machine direction in excess of about 3,000 pounds per square inch.

3. The container as recited in claim 1, wherein said substrate has a tear strength in the machine direction in excess of about 2,100 grams per square millimeter.

4. The container as recited in claim 1, wherein said substrate has a thickness of about 4 mil or greater.

5. The container as recited in claim 1, wherein said substrate comprises polyolefin.

6. The container as recited in claim 1, wherein said substrate comprises high density polyethylene.

7. The container as recited in claim 1, wherein said inorganic minerals further comprise calcium carbonate and titanium dioxide.

8. The container as recited in claim 1, wherein a first flap of the container blank is secured to a second flap of the container blank using an adhesive so as to form at least partly the main body portion of the container.

* * * * *